(12) United States Patent
Berning

(10) Patent No.: US 9,172,106 B2
(45) Date of Patent: Oct. 27, 2015

(54) FUEL CELL MICROPOROUS LAYER WITH MICROCHANNELS

(75) Inventor: Torsten Berning, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 1665 days.

(21) Appl. No.: 11/558,094

(22) Filed: Nov. 9, 2006

(65) Prior Publication Data

US 2008/0113241 A1    May 15, 2008

(51) Int. Cl.
H01M 8/10 (2006.01)
H01M 8/02 (2006.01)
H01M 8/04 (2006.01)

(52) U.S. Cl.
CPC .......... *H01M 8/1004* (2013.01); *H01M 8/0234* (2013.01); *H01M 8/04149* (2013.01); *Y02E 60/521* (2013.01)

(58) Field of Classification Search
None
See application file for complete search history.

(56) References Cited

U.S. PATENT DOCUMENTS

| 6,890,680 B2 | 5/2005 | Beckmann et al. | |
| 6,893,770 B2 | 5/2005 | Rock | |
| 2003/0157396 A1* | 8/2003 | Beckmann et al. | 429/44 |
| 2004/0023100 A1* | 2/2004 | Boff et al. | 429/38 |
| 2004/0209136 A1* | 10/2004 | Ren et al. | 429/30 |
| 2005/0084742 A1* | 4/2005 | Angelopoulos et al. | 429/44 |
| 2005/0221134 A1* | 10/2005 | Liu et al. | 429/13 |
| 2005/0233203 A1* | 10/2005 | Hampden-Smith et al. | 429/44 |
| 2006/0014073 A1 | 1/2006 | Kim et al. | |
| 2006/0140843 A1 | 6/2006 | Sung et al. | |
| 2006/0199061 A1 | 9/2006 | Fiebig et al. | |

FOREIGN PATENT DOCUMENTS

DE    10218857 A1    11/2003

OTHER PUBLICATIONS

DE 10 2007 052 833.9 Office Action dated Oct. 5, 2011; 9 pages.

* cited by examiner

*Primary Examiner* — Barbara Gilliam
*Assistant Examiner* — Adam A Arciero
(74) *Attorney, Agent, or Firm* — BrooksGroup

(57) ABSTRACT

One embodiment of the invention includes a product comprising: a solid polyelectrolyte membrane having a first face and an opposite second face; a first catalyst layer overlying the first face of the membrane; a first microporous layer overlying the first catalyst layer, and wherein the first microporous layer includes a plurality of microchannels formed therein open toward the first catalyst layer; and wherein each of the microchannels of the first microporous layer are defined by a surface that is free of cracks.

27 Claims, 5 Drawing Sheets

FUEL CELL MICROPOROUS LAYER WITH MICROCHANNELS

TECHNICAL FIELD

The field to which the disclosure generally relates includes fuel cell layers including microchannels and products including the same and method of making and using the same.

BACKGROUND

Liquid water is created inside a fuel cell for at least two fundamental reasons: (1) the creation of water during the electrochemical reaction, and (2) the condensation of incoming water vapor entering with humidified reaction gases. The amount of water created during the electrochemical reaction depends directly on the current density. The amount of incoming water vapor that condenses inside the gas flow channels of the collector plates depends on the operating conditions such as stoichiometry and the relative humidity of the incoming gas streams. Excess liquid water in the cell can partially block the gas flow fields creating what is known as "flooding."

Referring now to FIG. 1, many prior art fuel cells have been constructed using a solid polyelectrolyte membrane 12 having a cathode face 14 and an opposite anode face 16. A cathode electrode 18 including a catalyst supported on carbon particles, and an ionomer is formed on the cathode face 14 of the membrane 12. Similarly, an anode electrode 20 including a catalyst supported on carbon particles, and an ionomer is formed on the anode face 16 of the membrane 12. A microporous layer 22 may be provided over the cathode electrode 18. A gas diffusion media 24 may be provided over the microporous layer 22. A collector plate 26 is provided over the gas diffusion media 24, and wherein the collector plate 26 includes a plurality of lands 28 and channels 30 defining a reactant gas flow field. In this case, a reactant gas such as oxygen or air is provided through the channels 30 and diffuses through the gas diffusion media 24 and microporous layer 22 so that the cathode electrode 18 catalyzes the reaction of oxygen molecules with hydrogen protons to produce water. Such prior art fuel cell products are typically constructed to allow for the reaction produced water to diffuse through the microporous layer 22 and gas diffusion media 24. However, the water can begin to accumulate underneath the lands 28 of the bipolar plate 26 and result in a liquid layer 34 forming in the channel 30, which is known as "flooding." The flooding prevents the reactant gases from flowing towards the membrane 12 and thus adversely impacts fuel cell performance.

SUMMARY OF EXEMPLARY EMBODIMENTS OF THE INVENTION

One embodiment of the invention includes a product comprising: a solid polyelectrolyte membrane having a first face and an opposite second face; a first catalyst layer overlying the first face of the membrane; a first microporous layer overlying the first catalyst layer, and wherein the first microporous layer includes a plurality of microchannels formed therein open toward the first catalyst layer; and wherein each of the microchannels of the first microporous layer are defined by a surface that is free of cracks.

Other exemplary embodiments of the present invention will become apparent from the detailed description provided hereinafter. It should be understood that the detailed description and specific examples, while indicating the exemplary embodiment of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
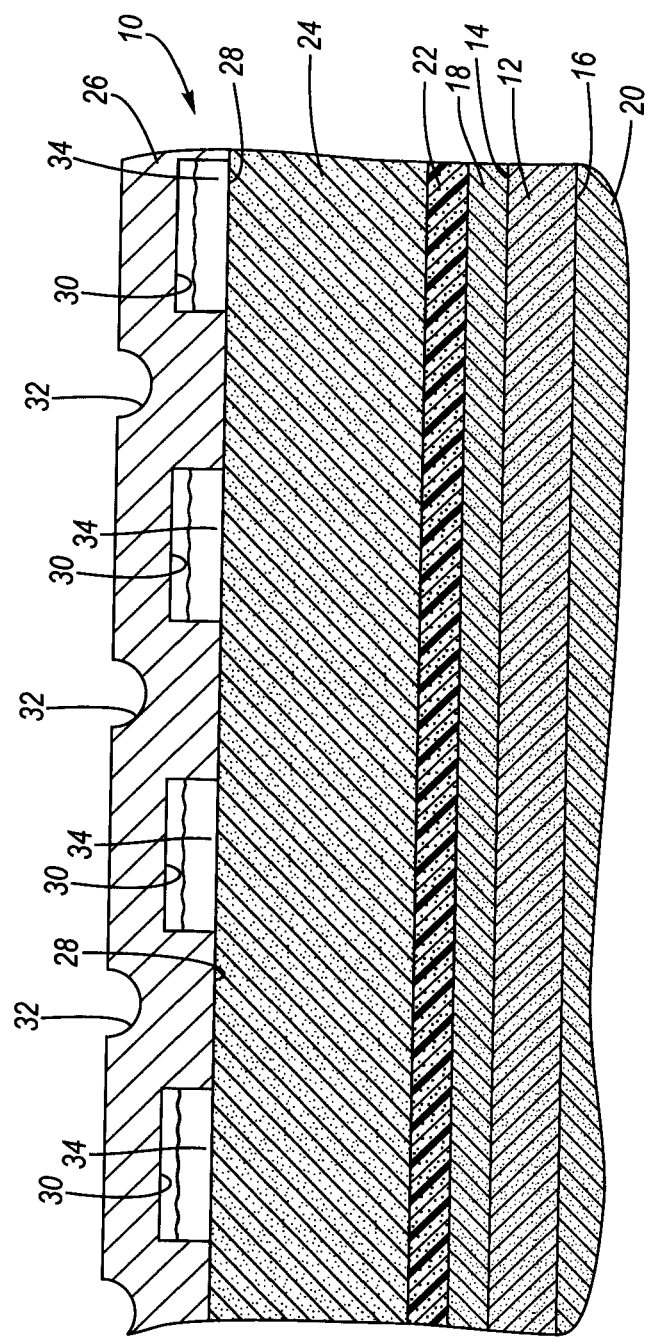
FIG. 1 illustrates a prior art fuel cell product and showing the flooding phenomenon.
Figure 2:
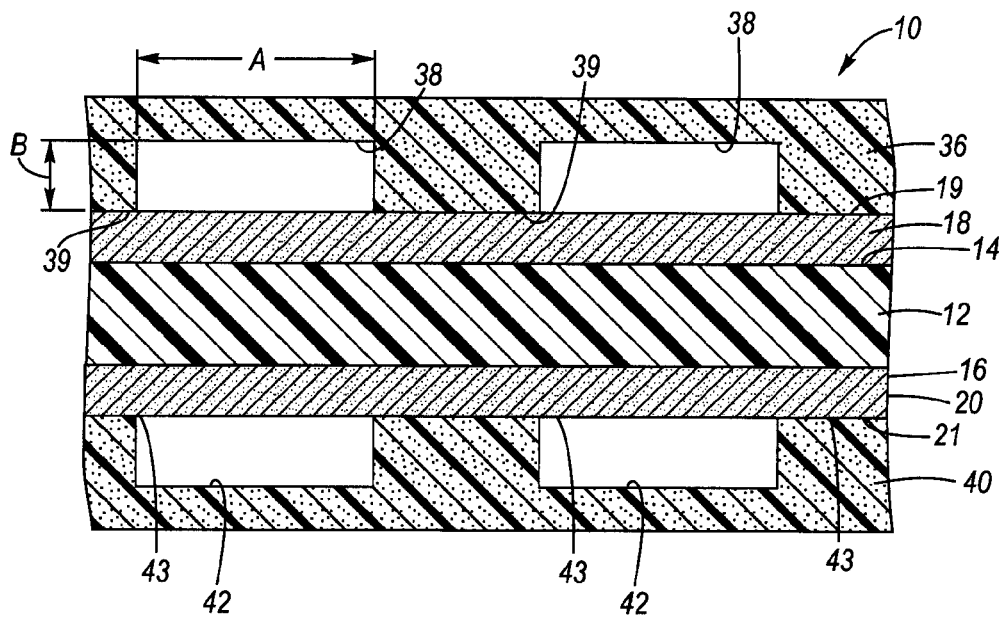
FIG. 2 illustrates a fuel cell component according to one embodiment of the invention.

Referring now to FIG. 2, one embodiment of the invention includes a product such as a fuel cell component 10 including a solid polyelectrolyte membrane 12 having a first face 14, such as a cathode face, and an opposite second face 16, such as an anode face. A first catalyst layer 18, such as a cathode electrode, may be provided over the first face 14 of the membrane 12. Likewise, a second catalyst layer 20, such as an anode electrode, may be provided under the second face 16 of the membrane 12. The catalyst layers 18 and 20, in one embodiment of the invention, may include a group of finely divided particles, such as carbon, supporting finely divided catalytic particles, such as platinum, and a proton conductive material intermingled with the particles. The proton conductive material may be an ionomer such as a perfluorinated sulfonic acid polymer. Preferred catalyst materials include metals such as platinum, platinum alloys and other catalysts known to those skilled in the fuel cell art.

Solid polymer electrolyte membranes 12 useful in embodiments of the present invention include ion-conductive materials. Suitable membranes are described in U.S. Pat. Nos. 4,272,353 and 3,134,697 and in the Journal of Power Sources, Volume 29 (1990), pages 367-387. The membranes 12 are ion exchange resin membranes. The resins include ionic groups in their polymeric structure, wherein one ionic component which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation exchange groups are sulfonic acid groups which are attached to the polymer backbone.

The formation of these ion exchange resins into membranes or sheets is well known to those skilled in the art. In one embodiment of the invention, the membrane is a perfluorinated sulfonic acid polymer electrolyte in which the entire membrane structure has ionic exchange characteristics. These membranes are commercially available, and a typical example of a sulfonic perfluorocarbon proton conductive membrane is sold by E.I. DuPont de Nemours & Company under the trade name NAFION. Other such membranes are available from Asahi Glass and Asahi Chemical Company. The use of other types of membranes such as, but not limited to, perfluorinated cation-exchange membranes, hydrocarbon based cation-exchange membranes as well as anion-exchange membranes are also within the scope of the invention.

Figure 7:
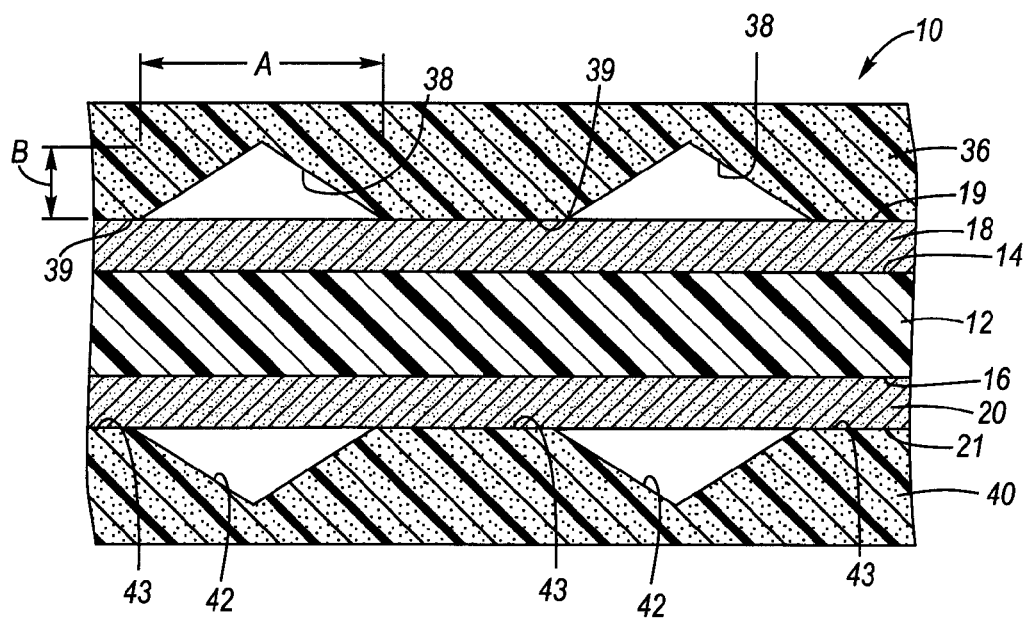
FIG. 7 illustrates a fuel cell component according to another embodiment of the invention.

In one embodiment of the invention, a first microporous layer 36 is provided over the first catalyst layer 18. The first microporous layer 36 includes a plurality of lands 39 and microchannels 38 formed in the microporous layer 36. The microchannels 38 may have a width, as illustrated by line A, ranging from about 20 µm to about 500 µm, and a depth, as illustrated by line B, ranging from about 10-20 µm. FIG. 7 illustrates an alternative embodiment wherein the channels 38, 42 have a V shape. The V shaped channel reduces the likelihood that water droplets will form blocking the channel. The microporous layer 36 may have a thickness ranging from about 30-40 µm. In one embodiment of the invention, the microporous layer 36 may include particles and a binder. Suitable particles for the microporous layer 36 may include, but is not limited to, graphitic, graphitized, or conductive carbon particles. Suitable binders for the microporous layer 36 may include at least one of polytetrafluoroethylene (PTFE), polyvinylidenefluoride (PVDF), fluoroethylene propylene (FEP) or other organic or inorganic hydrophobic materials.

The microporous layer 36 is hydrophobic and is formed so that the surface defining the microchannel 38 limits or controls the passage of water therethrough. If cracks are present in the surface defining the microchannel 38, 42, the cracks are less than the width of the microchannel 38, 42, for example, less than 20 µm, or less than 10 µm or less than 5 µm. In one embodiment, the microporous layer 36 is substantially crack free.

In one embodiment of the invention, the microporous layer 36 is formed by depositing a slurry on a substrate. The slurry including carbon and a binder is slowly dried so that the dried microporous layer 36 is substantially free of cracks.

In one embodiment of the invention, water that accumulates in the microchannel 38 from the reaction of reactant gases or due to condensation of water vapor in the reactant gases will stay in the channel 38 and not diffuse through the microporous layer 36 or gas diffusion layer 24 to the channels 30 in the bipolar plate 26. Such an arrangement keeps the water in the microchannels 38 near the membrane 12, thereby maintaining humidity in the membrane 12 and enhancing the performance of the fuel cell. In one embodiment, the microchannels 38 are formed substantially parallel to the channels 30 (shown in FIG. 6) in the bipolar plate 26 so that water in the microchannels 38 travels towards the inlet for the reactant gas and humidifies the incoming reactant gas. Water in the microchannel 38 can be used to humidify incoming air or oxygen, and/or water in the microchannels 42 may be used to humidify incoming hydrogen gas.

Similarly, a second microporous layer 40 may be formed to underlie the second catalyst layer 20. The second microporous layer 40 is constructed in a similar manner as the first microporous layer 36 and includes a plurality of lands 43 and microchannels 42. The microporous layers 36, 40 have pores, all of which have a pore size less than 1 µm, 0.18 mm to 0.04 µm, 0.11 µm to 0.06 µm or pore sizes therebetween.

Figure 3:
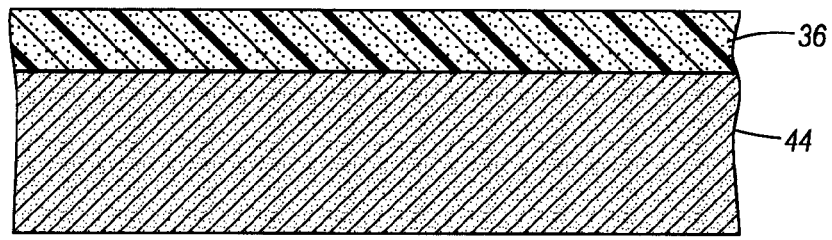
FIG. 3 illustrates a method of making a fuel cell product according to one embodiment of the invention.
Figure 4:
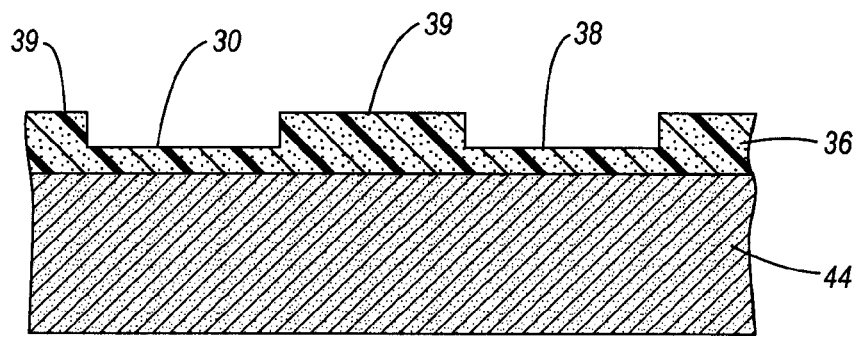
FIG. 4 illustrates a method of making a fuel cell component according to one embodiment of the invention.

Referring now to FIG. 3, one embodiment of the invention includes a method of making a microporous layer 36 having a plurality of microchannels formed therein. A slurry including carbon particles, a binder and a solvent may be deposited on a substrate 44 and dried to form the microporous layer 36. Thereafter, microchannels 38 may be formed in the microporous layer 36 by any of a variety of ways including, but not limited to, machining, etching, or embossing the microporous layer 36 in a wet or dry state (as shown in FIG. 4). In one embodiment, the substrate 44 may be a gas diffusion media.

Figure 5:
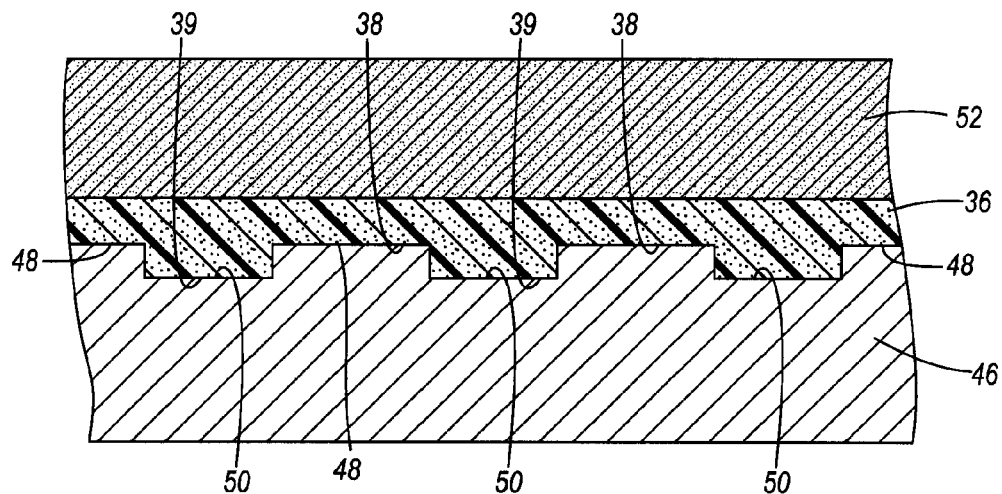
FIG. 5 illustrates a method of making a fuel cell component according to another embodiment of the invention.

Referring now to FIG. 5, another embodiment of the invention includes a method of making a microporous layer 36 including providing a mandrel 46 having a first face including a plurality of lands 48 and channels 50 defined therein and depositing a slurry including carbon particles, a binder and a solvent over the mandrel 46 and drying the same so that the resultant microporous layer 36 includes a plurality of lands 39 and microchannels 38. Optionally, a backing 52 may be placed on the microporous layer 36 in either a dry state (with an adhesive) or wet state. In one embodiment, the backing 52 may be a gas diffusion media material.

Figure 6:
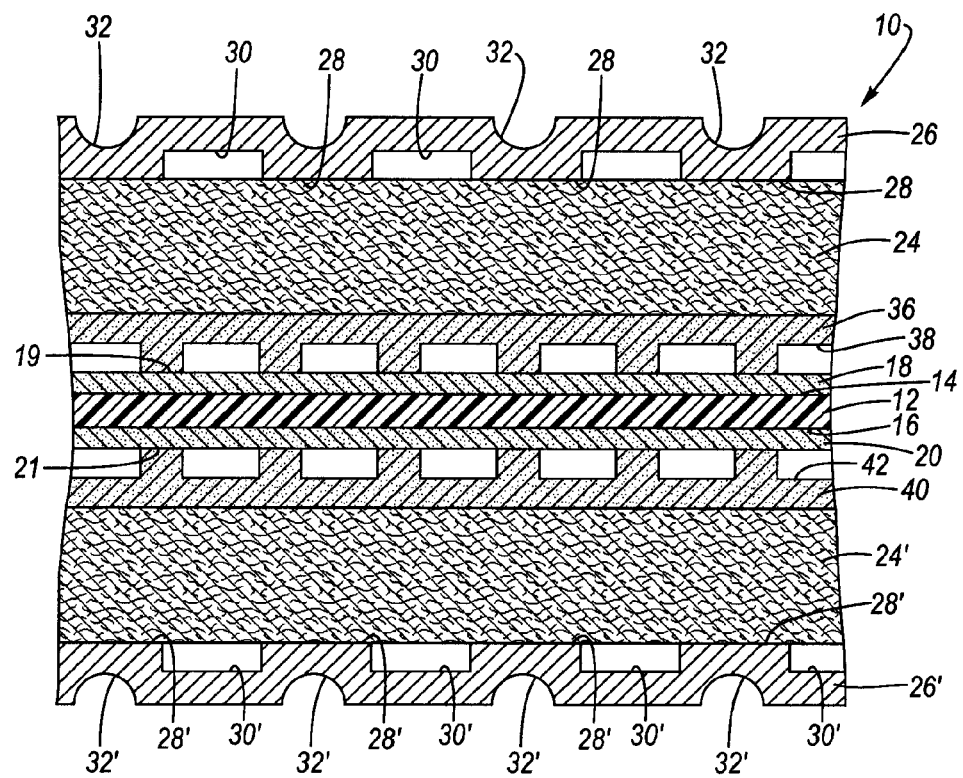
FIG. 6 illustrates a fuel cell component according to one embodiment of the invention.

Referring now to FIG. 6, one embodiment of the invention includes a fuel cell component 10 including a solid polyelectrolyte membrane 12 having a cathode face 14 and a cathode electrode 18 including a catalyst therein overlying the cathode face 14. A first microporous layer 36 is provided over the cathode electrode 18 and includes a plurality of microchannels 38 open toward an upper face 19 of the cathode electrode 18. A first gas diffusion layer 24 may be provided over the first microporous layer 36. A first bipolar plate 26 may be provided over the first gas diffusion media layer 24. The first bipolar plate 26 includes a plurality of lands 28 and channels 30 formed in a first face, and optionally a plurality of cooling channels 32 formed in a second face.

An anode electrode 20, including a catalyst therein is formed on the anode face 16 of the membrane 12. A second microporous layer 40 is formed under the anode electrode 20 and includes a plurality of microchannels 42 open toward a first face 21 of the anode electrode 20. A second gas diffusion media layer 24' may be provided under the second microporous layer 40 and a second bipolar plate 26' may be provided under the second gas diffusion media layer 24'. The second bipolar plate 26' also includes a plurality of lands 28' and gas flow channels 30' defined on the first face, and a plurality of cooling fluid channels 32' defined on the second face.

Figure 8:
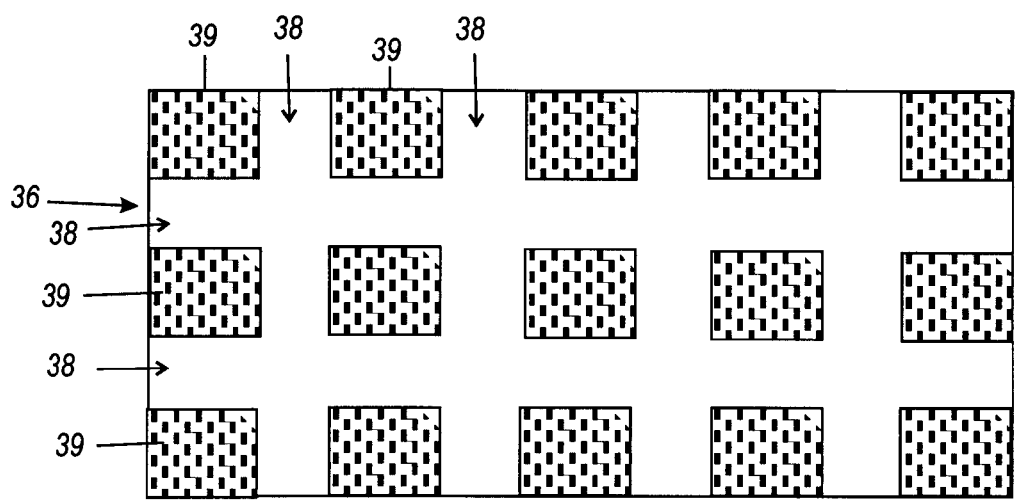
FIG. 8 illustrates a fuel cell component according to another embodiment of the invention.

In one embodiment of the invention, the microchannels 38, 42 may be constructed to run generally parallel to the channels 30, 30' of the bipolar plates respectively. Alternatively, the microchannels 38, 42 may run perpendicular or in a skewed direction to the channels 30, 30'. FIG. 8 illustrates another embodiment of a microporous layer 36 with microchannels 38 running in two opposite directions.

Figure 9:
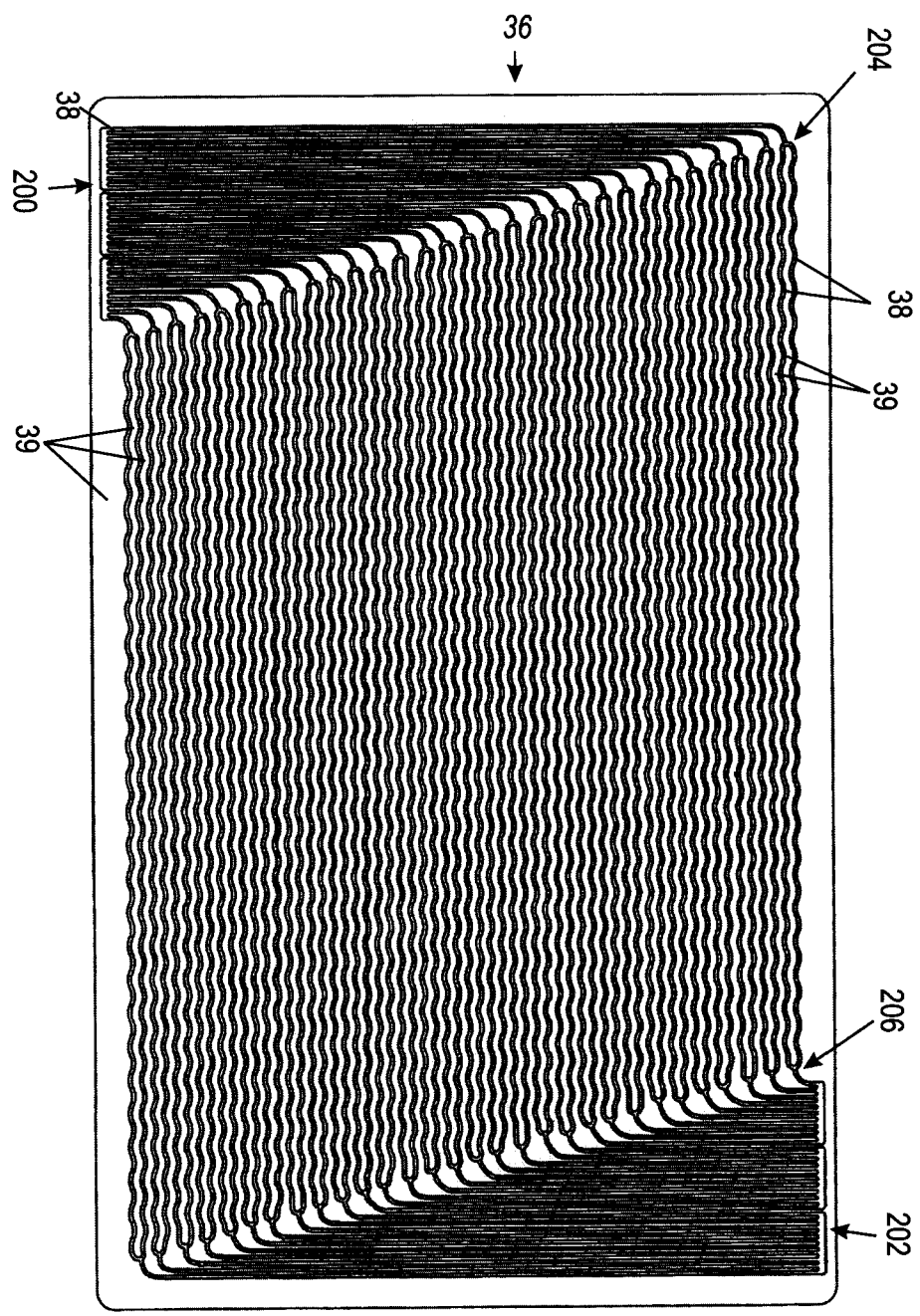
FIG. 9 illustrates a fuel cell component according to another embodiment of the invention.

FIG. 9 illustrates another embodiment of a microporous layer 36 having a plurality of lands 39 and channels 38 formed therein. The channels 38 include a single channel segment that may start at a location 200 corresponding to, for example, the cathode gas inlet, and becomes branched at a location 204. The branched channel becomes a single channel segment at a location 206 and extends to a location 202 corresponding to, for example, the cathode gas outlet.

When the terms "over," "overlying," "overlies," or "under," "underlying," "underlies" are used herein with respect to the relative position of a first component or layer with respect to a second component or layer, such shall mean that the first component or layer is in direct contact with the second component or layer, or that additional layers or components may be interposed between the first component or layer and the second component or layer.

The above description of embodiments of the invention is merely exemplary in nature and, thus, variations thereof are not to be regarded as a departure from the spirit and scope of the invention.

What is claimed is:

1. A product fuel cell comprising:
a solid polyelectrolyte membrane having a first face and an opposite second face;
a first layer comprising a catalyst overlying the first face of the membrane;
a first microporous layer overlying the first layer comprising a catalyst, and wherein the first microporous layer includes a plurality of microchannels formed therein open toward a first layer comprising a catalyst;
a first gas diffusion media layer overlying the first microporous layer;
and wherein each of the microchannels of the first microporous layer are defined by a surface that is free of cracks, wherein each of the microchannels in the first microporous layer has a depth ranging from about 10-20 µm; and,
wherein at least a portion of the microchannels are directed in a direction towards an inlet of a reactant gas supply comprising said fuel cell.

2. A product as set forth in claim 1 wherein the first microporous layer has a thickness ranging from 30-40 µm.

3. A product as set forth in claim 1 wherein the first microporous layer has a plurality of pores therein all having a pore size less than 1 µm.

4. A product as set forth in claim 1 further comprising a first bipolar plate overlying the first gas diffusion media layer, and wherein the first bipolar plate includes a gas flow field defined by a plurality of lands and channels formed in a face of the first bipolar plate.

5. A product as set forth in claim 4 wherein the microchannels of the first microporous layer run generally parallel to the channels formed in the first bipolar plate.

6. A product as set forth in claim 1 further comprising an anode layer comprising a catalyst underlying the second face of the membrane.

7. A product as set forth in claim 6 further comprising a second microporous layer underlying the anode layer, and wherein the second microporous layer includes a plurality of second microchannels formed therein open toward a first face of the anode layer.

8. A product as set forth in claim 7 wherein the thickness of the second microporous layer ranges from about 30-40 µm.

9. A product as set forth in claim 8 wherein each of the second microchannels has a depth ranging from about 10-20 µm.

10. A product as set forth in claim 7 wherein the second microporous layer includes pores each having a pore size less than 1 µm.

11. A product as set forth in claim 7 further comprising a second gas diffusion media layer underlying the second microporous layer.

12. A product as set forth in claim 11 further comprising a second bipolar plate underlying the second gas diffusion media layer, and wherein the second bipolar plate includes a gas flow field defined by a plurality of lands and channels formed in the second bipolar plate.

13. A product as set forth in claim 12 wherein the microchannels of the second microporous layer run generally parallel to the channels of the second bipolar plate.

14. A product as set forth in claim 4 wherein the microchannels of the first microporous layer do not run parallel to the channels formed in the first bipolar plate.

15. A product as set forth in claim 1 wherein at least one of the microchannels of the first microporous layer is branched.

16. A product as set forth in claim 1 wherein at least one of the microchannels of the first microporous layer is V shaped.

17. A product as set forth in claim 15 wherein the at least one microchannel branch comprises a single channel segment at a first location that becomes branched at a second location and becomes a single channel segment again at a third location.

18. A product as set forth in claim 1 wherein the first layer further comprises a proton conductive material comprising perfluorinated sulfonic acid polymer.

19. A product as set forth in claim 6 wherein the anode layer further comprises proton conductive material comprising perfluorinated sulfonic acid polymer.

20. A product as set forth in claim 1 wherein the first microporous layer comprises a binder comprising fluoroethylene propylene.

21. A product as set forth in claim 6 wherein the second microporous layer comprises a binder comprising fluoroethylene propylene.

22. A product fuel cell comprising:
a solid polyelectrolyte membrane having a first face and an opposite second face;
a first layer comprising a catalyst overlying the first face of the membrane;
a first microporous layer overlying the first layer comprising a catalyst, and wherein the first microporous layer includes a plurality of microchannels formed therein open toward a first layer comprising a catalyst;
a first gas diffusion media layer overlying the first microporous layer;
and wherein each of the microchannels of the first microporous layer are defined by a surface that is free of cracks;
an anode layer comprising a catalyst underlying the second face of the membrane;
a second microporous layer underlying the anode layer, and wherein the second microporous layer includes a plurality of second microchannels formed therein open toward a first face of the anode layer;
a second gas diffusion media layer overlying the second microporous layer;
and wherein each of the microchannels in the second microporous layer are defined by a surface that is free of cracks;
wherein each of the microchannels of the first and second microporous layers have a width ranging from about 20 µm-500 µm; and,
wherein at least a portion of the microchannels are directed in a direction towards an inlet of a reactant gas supply comprising said fuel cell.

23. A product as set forth in claim 22 further comprising:
a first bipolar plate overlying the first gas diffusion media layer, and wherein the bipolar plate includes a gas flow field defined by a plurality of lands and channels formed in a face of the first bipolar plate, and wherein the microchannels of the first microporous layer runs generally parallel to the channels formed in the face of the first bipolar plate;

a second bipolar plate underlying the second gas diffusion media, and wherein the second bipolar plate includes a gas flow field defined by a plurality of lands and channels formed in a face of the second bipolar plate, and wherein the microchannels of the second microporous layer runs generally parallel to the channels formed in the face of the second bipolar plate.

24. A product as set forth in claim 22 further comprising:

a first gas diffusion layer overlying the first microporous layer;

a first bipolar plate overlying the first gas diffusion media layer, and wherein the bipolar plate includes a gas flow field defined by a plurality of lands and channels formed in a face of the first bipolar plate, and wherein the microchannels of the first microporous layer do not run parallel to the channels formed in the face of the first bipolar plate;

a second gas diffusion media underlying the second microporous layer;

a second bipolar plate underlying the second gas diffusion media, and wherein the second bipolar plate includes a gas flow field defined by a plurality of lands and channels formed in a face of the second bipolar plate, and wherein the microchannels of the second microporous layer runs generally parallel to the channels formed in the face of the second bipolar plate.

25. A product as set forth in claim 22 wherein at least one of the microchannels of the first microporous layer is branched.

26. A product as set forth in claim 22 wherein at least one of the microchannels of the first microporous layer is V shaped.

27. A product as set forth in claim 25 wherein the at least one microchannel branch comprises a single channel segment at a first location that becomes branched at a second location and becomes a single channel segment again at a third location.

* * * * *